Nov. 7, 1939.  W. E. STEWART  2,178,923
AUTOMOBILE BED
Filed April 21, 1938  2 Sheets-Sheet 2
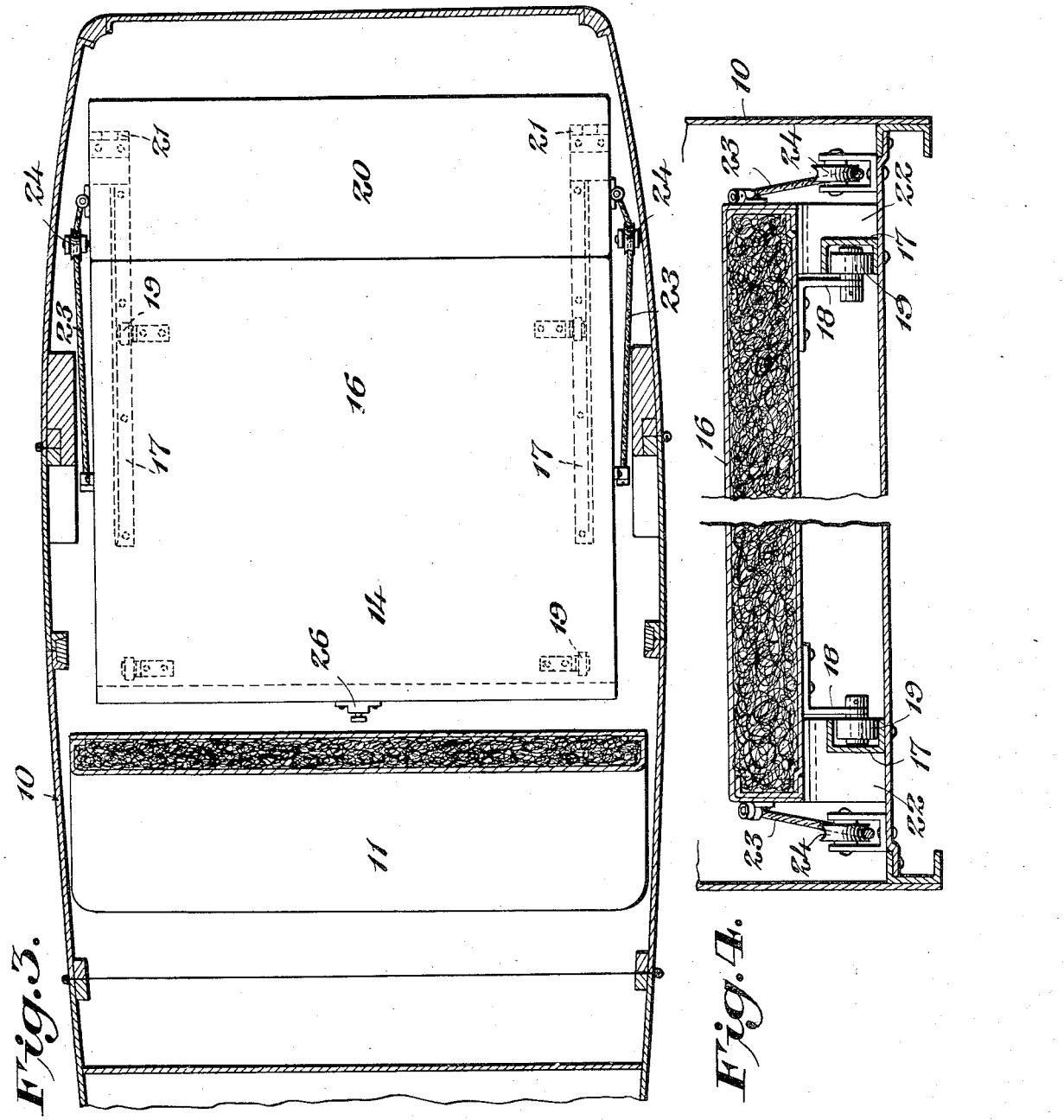
Inventor
William E. Stewart,
By D. P. Wolhaupter
Attorney Patented Nov. 7, 1939

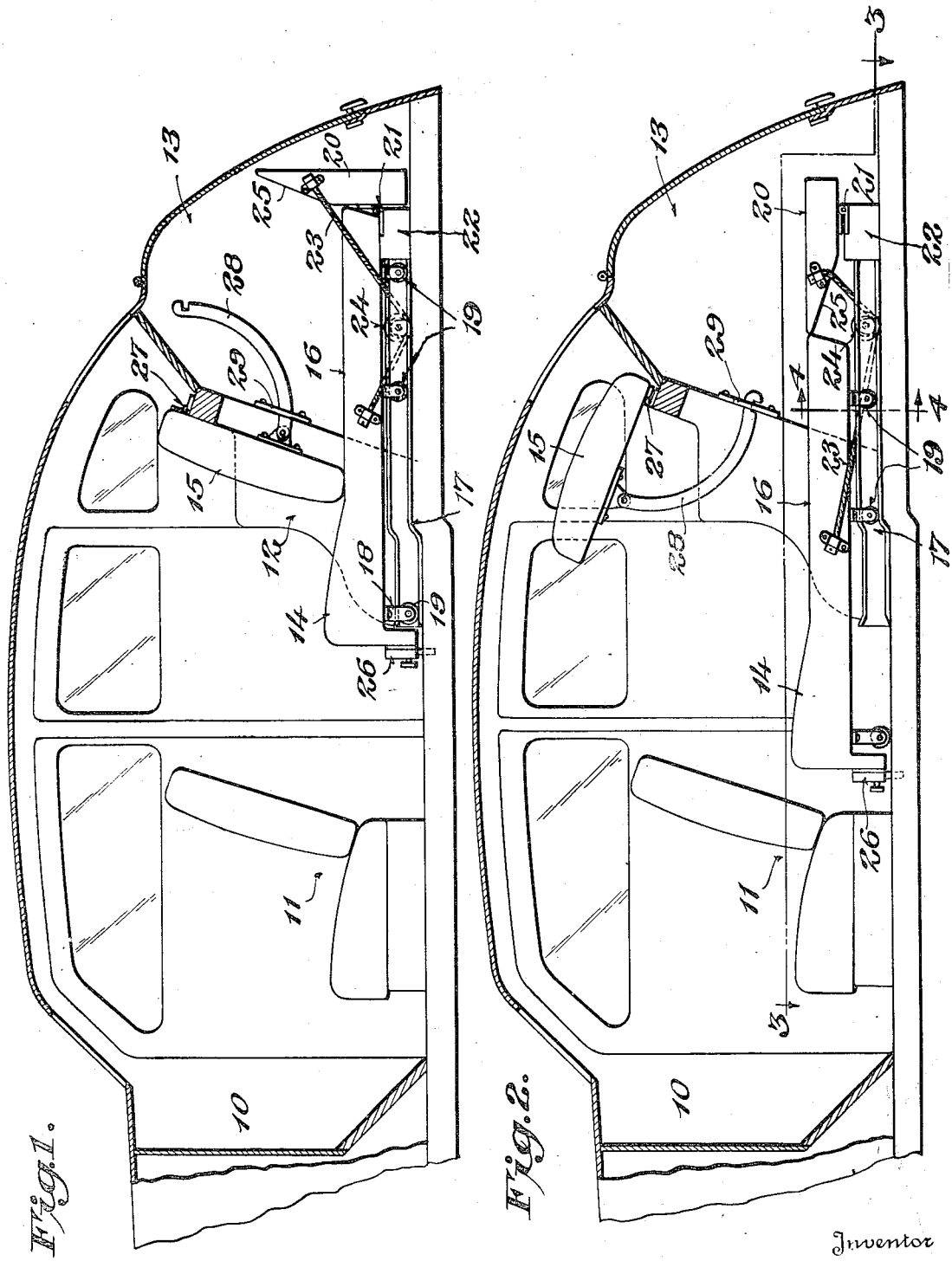

2,178,923

UNITED STATES PATENT OFFICE 2,178,923

AUTOMOBILE BED

William Ellison Stewart, Hollidays Cove, W. Va.

Application April 21, 1938, Serial No. 203,397

4 Claims. (Cl. 155—7)

This invention relates to motor vehicles, and is concerned more particularly with the provision of such vehicles with sleeping accommodations of the character described and claimed in my prior application, Serial No. 163,840, filed September 14, 1937, of which the present application is, in major part, a continuation.

Generally speaking, the object of the invention is to provide a motor vehicle with a bed which is readily shiftable between a stored position and a position for use; which, when stored, does not reduce the space within the vehicle available for the use of passengers nor change the appearance of the usual seating arrangement of the vehicle; which occupies very little space which, in the absence of the bed, would be available for use; which occupies only such otherwise available space as would be used for luggage carrying purposes; and which does not interfere with the placing of luggage in, or its removal from, said luggage carrying space.

A special object of the invention is to provide a motor vehicle bed the front end portion of which serves normally as the bottom of a seat of the vehicle, and which embodies a novel construction and novel mounting means whereby it may be positioned for use by a single manual operation involving simply sliding the same forwardly from its normal position in which its front end portion constitutes the bottom of a seat of the vehicle.

According to the invention, the front end and the medial portions of the bed are of unitary construction and the medial portion extends beneath the back of the seat into a luggage compartment at the rear of the vehicle; the seat back is mounted to be swung upwardly to an out-of-the-way position, and the rear portion of the bed is comprised by a separate section mounted in the luggage compartment to occupy an upright position when the bed is in its stored position and to occupy a horizontal position forming a rearward continuation of the medial portion of the bed when the latter is in its forwardly disposed position. In this connection, another special object of the invention is to provide simple, reliable means whereby the rear section is swung to its upright position when the front and the medial portions of the bed are slid rearwardly, and is swung to a horizontal position forming, in effect, a rearward continuation of the medial portion of the bed when the front and the medial portions are slid forwardly.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is a longitudinal section through a motor vehicle having a bed embodied therein in accordance with the invention and showing the bed in its stored position.

Figure 2 is a view similar to Fig. 1 showing the bed positioned for use.

Figure 3 is a horizontal section on the line 3—3 of Fig. 2; and

Figure 4 is a cross section on the line 4—4 of Fig. 2.

Referring to the drawings in detail, 10 designates a motor vehicle body of a well known general type having a front seat designated generally as 11, a rear seat designated generally as 12, and behind the rear seat 12, a luggage compartment designated generally as 13, all generally in accordance with common practice.

The rear seat 12 comprises, as usual, a bottom 14 and a separate back 15, and, in accordance with the invention, the said seat bottom 14, which also constitutes the front portion of the present bed, is provided with a rearwardly directed, horizontally disposed extension 16 which constitutes the medial portion of the present bed.

The seat bottom 14 and its extension 16 may be of any suitable construction and are formed as a unit which, in accordance with the invention, is mounted in the vehicle body 10 for forward and rearward sliding movement from and to a normal position in which the said seat bottom serves its normal function as a bottom for the seat 12.

Any suitable means may be employed to mount the unit comprising the seat bottom 14 and its extension 16 for free and easy forward and rearward sliding movement. For example, said unit may simply be equipped with rollers to roll upon the vehicle floor and any suitable means may be employed to guide said unit when it is rolled forwardly or rearwardly. Preferably, however, the means for mounting said unit is of a nature such as to hold the same against being bounced from its operative position by travel of the vehicle over rough roads. To this end, and as illustrated in the present instance, track rails in the form of channel members 17 are fastened upon the floor of the vehicle in spaced apart, parallel relationship extending longitudinally of the vehicle, and on edge with their channels facing either inwardly or outwardly as desired, and on the lower ends of brackets 18 depending from the unit are mounted rollers 19 to ride in the channels of said track rails.

The track rails 17 do not extend forwardly beyond the front of the seat 12 so as not to obstruct the floor in advance of said seat. In this connection it will be noted that while the front rollers 19 leave said track rails and roll upon the floor of the car when the bed unit 14—16 is slid forwardly, they are located to be received in the front end portions of said track rails when said bed unit is slid rearwardly to its position in which its front end portion serves as the bottom of the seat 12. Thus, when said bed unit is in its rearwardly disposed or stored position it is effectively held by the rollers and the track rails against lateral or vertical movements relative to the vehicle body.

The rear end portion of the bed is comprised by a section 20 which is separate from the unit 14—16 and which is mounted in the luggage compartment 13 for swinging movement between an upright position as shown in Fig. 1 and a horizontal position as shown in Fig. 2. Said section 20 may be mounted for swinging movement in any suitable manner, as for example, by being hinged, as indicated at 21 to blocks 22 fastened to the vehicle floor. In any event, suitable means are provided to swing said section to its upright position when the unit 14—16 is slid rearwardly, and to swing said section to a horizontal position in which it constitutes, in effect, a rear extension of the medial portion 16 of the bed, when the unit 14—16 is slid forwardly.

While the means for swinging the section 20 to its upright position may comprise a suitable connection with the unit 14—16, said means appropriately may comprise a suitable spring or springs which may be embodied in the hinges 21 and which tend constantly to urge said section to its upright position. Also, while any suitable means may be provided to swing the section 20 to its horizontal position when the unit 14—16 is slid forwardly, said means appropriately may consist, as shown, of a pair of cables or equivalent flexible elements 23, one at each side of the bed, each fastened at one end to the unit 14—16 and, at its other end to the section 20 above or forwardly of the pivotal axis of said section, and engaged intermediate its ends beneath a related fixed sheave 24 mounted, for example, upon the vehicle floor at a point suitably spaced forwardly from the pivotal axis of said section 20.

When the unit 14—16 is in its rearmost or normal position the section 20 is in its upright position as shown in Fig. 1. Accordingly, when the unit 14—16 is slid forwardly the flexible elements 23 operate in an obvious manner to swing the section 20 to its horizontal position. On the other hand, when the unit 14—16 is slid rearwardly, the section 20 is swung to its upright position by the aforesaid spring means. In this connection it will be observed that the top or front end portion of the section 20 is beveled, as indicated at 25, to avoid interference with the rear end of the unit 14—16 during sliding of said unit and swinging of said section 20.

At the front of the unit 14—16 is a suitable latch 26 for cooperation with suitable keepers to lock said unit in both its forward and its rear positions.

The back 15 of the seat 12 may be removable, but preferably it is hinged at its top, as indicated at 27, and is provided at one or both sides with an arm 28 notched or otherwise formed at its free end for cooperation with a suitable fixed bracket 29 to hold the back in an upwardly swung, out-of-the-way position as shown in Fig. 2.

Normally the parts occupy positions as shown in Fig. 1. That is to say, the seat back 15 is in its lowered position, the unit 14—16 is in its rear position in which the front portion 14 thereof serves as the bottom of the seat 12 and the portion 16 thereof extends beneath the seat back into the luggage compartment 13, and the section 20 is in its upright position. Assuming such position of said parts, it is manifest that, to adapt the bed for use, all that is required is to swing the seat back 15 upwardly to its position illustrated in Fig. 2 and to slide the seat bottom forwardly. On the other hand, it is equally apparent that, to store and hide the bed, all that is required is to push the seat bottom rearwardly and to lower the seat back 15. Moreover, it is apparent that the present bed is simple, practical, easily installed, occupies very little space which otherwise would be available and, when not positioned for use, does not change the appearance of the interior of the vehicle nor interfere in any way with the seating accommodations thereof. It is further apparent that while the invention has been illustrated in the present instance as embodied in a vehicle having front and rear seats, it is equally capable of embodiment in a vehicle having only a single or front seat.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a motor vehicle, a seat including a back and a bottom, a bed medial portion formed as a unit with said seat bottom and extending rearwardly therefrom beneath the seat back, said seat bottom constituting the front portion of the bed, a rear bed section separate from said medial bed portion and located rearwardly of the latter, means mounting said rear bed section for swinging movement between an upright position and a horizontal position in which it constitutes in effect a rearward extension of the medial bed portion, means mounting said seat bottom and said bed medial portion for sliding movement forwardly from and rearwardly to a normal position in which the seat bottom serves its normal function as the bottom of said seat, means whereby the rear bed section is swung to its upright position when the seat bottom and the medial bed portion are slid rearwardly to their normal position, and means whereby said rear bed section is swung to its horizontal position when the seat bottom and the medial bed portion are slid forwardly from their normal position.

2. In a motor vehicle, a seat including a back and a bottom, a bed medial portion formed as a unit with said seat bottom and extending rearwardly therefrom beneath the seat back, said seat bottom constituting the front portion of the bed, a rear bed section separate from said medial bed portion and located rearwardly of the latter, means mounting said rear bed section for swinging movement between an upright position and a horizontal position in which it constitutes in effect a rearward extension of the medial bed portion, means mounting said seat bottom and said bed medial portion for sliding movement forwardly from and rearwardly to a normal position in which the seat bottom serves its normal function as the bottom of said seat, means tending constantly to swing said rear bed section to its upright position, and a connection between said medial bed portion and said rear bed section whereby the latter is swung to its horizontal position when the seat bottom and the medial bed portion are slide forwardly from their normal position.

3. The combination as set forth in claim 2 in which the connection between the bed medial portion and the bed rear section comprises a flexible element connected at one end with said bed medial portion and at its other end with said bed rear section, forwardly of the pivotal axis of said section, and a fixed sheave under which the medial portion of said flexible element extends.

4. In a motor vehicle having a body, a seat including a back and a bottom, a bed medial portion formed as a unit with said seat bottom and extending rearwardly therefrom beneath the seat back, said seat bottom constituting the forward portion of the bed, means mounting said seat bottom and said bed medial portion on the vehicle body for sliding movement forwardly from and rearwardly to a normal position in which the seat bottom serves its normal function as the bottom of said seat, and a rear bed section, separate from said medial bed portion, located rearwardly of said medial bed portion and pivotally mounted on the vehicle body for swinging movement to an upright, out-of-the-way position to permit the seat bottom and the bed medial portion unit to be slid to its rear position, and to a substantially horizontal position, with its top substantially in the plane of the top of the medial bed portion and with its front edge substantially abutting the rear edge of the bed medial portion, thereby to constitute, in effect, a rearward extension of the bed medial portion when the latter and the seat bottom are in a forwardly disposed position, the seat back being movable to an out-of-the-way position relative to the bed.

WILLIAM ELLISON STEWART.